US012459178B2

(12) United States Patent
Ferniani et al.

(10) Patent No.: US 12,459,178 B2
(45) Date of Patent: Nov. 4, 2025

(54) METHODS AND APPARATUS FOR INJECTION AND MANUFACTURE OF MOLDED COMPONENTS WITH VACUUM ASSIST

(71) Applicant: CROCS, INC., Niwot, CO (US)

(72) Inventors: Stefano Ferniani, Padua (IT); Luca Faggin, Padua (IT)

(73) Assignee: Crocs, Inc., Broomfield, CO (US)

( * ) Notice: Subject to any disclaimer, the term of this patent is extended or adjusted under 35 U.S.C. 154(b) by 240 days.

(21) Appl. No.: 15/657,860

(22) Filed: Jul. 24, 2017

(65) Prior Publication Data

US 2018/0022000 A1 Jan. 25, 2018

Related U.S. Application Data

(60) Provisional application No. 62/365,582, filed on Jul. 22, 2016.

(51) Int. Cl.
*B29C 45/17* (2006.01)
*B29C 33/00* (2006.01)
(Continued)

(52) U.S. Cl.
CPC ...... *B29C 45/1701* (2013.01); *B29C 33/0038* (2013.01); *B29C 45/1642* (2013.01);
(Continued)

(58) Field of Classification Search
CPC . B29C 45/1701; B29C 69/02; B29C 33/0038; B29C 45/1642; B29C 45/2608;
(Continued)

(56) References Cited

U.S. PATENT DOCUMENTS

| 2,474,721 A | 6/1949 | Billner |
| 3,335,462 A | 8/1967 | Grigull et al. |
| | (Continued) | |

FOREIGN PATENT DOCUMENTS

| CN | 1874656 A | 12/2006 |
| CN | 104736312 A | 6/2015 |
| | (Continued) | |

OTHER PUBLICATIONS

Paul E. Allen, " Injection-Mold Venting: The Hidden Processing Parameter," @ 2009, downloaded from http://logicseal.com/articles.html (8 pages).
(Continued)

*Primary Examiner* — Alison L Hindenlang
*Assistant Examiner* — Alexander A Wang
(74) *Attorney, Agent, or Firm* — Wilmer Cutler Pickering Hale and Dorr LLP

(57) ABSTRACT

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material at the first molding material while the first molding material remains with the first platen or the second platen; sealing a space between the first and second platens; removing a gas from the space while the space is sealed; and closing the mold while the space is sealed.

15 Claims, 17 Drawing Sheets

(51) Int. Cl.
  *B29C 45/16* (2006.01)
  *B29C 45/26* (2006.01)
  *B29C 69/02* (2006.01)
  *B29D 35/00* (2010.01)
  *B29D 35/14* (2010.01)
  *B29C 45/27* (2006.01)

(52) U.S. Cl.
  CPC ...... *B29C 45/2602* (2013.01); *B29C 45/2608* (2013.01); *B29C 69/02* (2013.01); *B29D 35/0036* (2013.01); *B29D 35/0045* (2013.01); *B29D 35/142* (2013.01); *B29C 45/16* (2013.01); *B29C 2045/2706* (2013.01); *B29C 2791/006* (2013.01)

(58) Field of Classification Search
  CPC .......... B29C 45/2602; B29C 2791/006; B29C 2045/2706; B29C 45/16; B29C 33/123; B29C 45/23; B29C 43/56; B29C 39/42; B29C 33/24; B29C 33/126; B29C 31/008; B29C 44/42; B29C 2045/1673; B29C 2043/561; B29D 35/0045; B29D 35/0036; B29D 35/142; B29D 35/0009; B29D 35/062; B29D 35/04; B29D 35/081
  See application file for complete search history.

(56) References Cited

U.S. PATENT DOCUMENTS

| | | |
|---|---|---|
| 3,398,434 A | 8/1968 | Alesi et al. |
| 4,277,435 A | 7/1981 | Allen |
| 5,395,226 A | 3/1995 | Sakai et al. |
| 5,780,078 A | 7/1998 | Chen |
| 6,224,367 B1* | 5/2001 | Maier ............... B29C 33/24 425/451.6 |
| 7,484,952 B2 | 2/2009 | Hsu |
| 7,622,062 B2* | 11/2009 | Forster ............ B29C 70/305 264/113 |
| 2002/0028261 A1* | 3/2002 | Alessio ............ B29C 31/008 425/112 |
| 2013/0037232 A1 | 2/2013 | Pham et al. |
| 2013/0260080 A1* | 10/2013 | Roberts ............ B29C 44/0461 428/71 |
| 2014/0001668 A1 | 1/2014 | Hsu |
| 2016/0082635 A1* | 3/2016 | Kobayashi ............ B29C 70/48 264/257 |
| 2016/0158981 A1* | 6/2016 | Fitzpatrick ............ B29C 45/60 264/328.16 |
| 2017/0173857 A1* | 6/2017 | Park ................... B29C 66/81431 |
| 2017/0348923 A1* | 12/2017 | Rosso .................. B29C 70/545 |
| 2018/0029315 A1* | 2/2018 | Howland ............ B29C 70/467 |
| 2018/0147802 A1 | 5/2018 | Isse |
| 2020/0031073 A1 | 1/2020 | Ferniani et al. |

FOREIGN PATENT DOCUMENTS

| | | |
|---|---|---|
| JP | 2005262494 A | 9/2005 |
| KR | 20090126416 A | 12/2009 |

OTHER PUBLICATIONS

"Thermoset Injection Mold Design Tips," Plenco Plastics Engineering Company, Sheboygan, Wisconsin, Jan. 30, 2017 (17 pages).
Tim Toth, "The Use of Vents in the Injection Molding Process," Toth Mold/Die, Inc., Bedford, Ohio, Dec. 27, 2013 (5 pages).

* cited by examiner

METHODS AND APPARATUS FOR INJECTION AND MANUFACTURE OF MOLDED COMPONENTS WITH VACUUM ASSIST

RELATED APPLICATION

This application claims benefit under 35 U.S.C. § 119(e) to U.S. Provisional Patent Application No. 62/365,582, filed on Jul. 22, 2016, titled "METHODS AND APPARATUS FOR INJECTION AND MANUFACTURE OF MOLDED COMPONENTS WITH VACUUM ASSIST," which is explicitly incorporated by reference herein in its entirety.

TECHNICAL FIELD

Embodiments of the present disclosure relate to injection molding. More specifically, embodiments of the present disclosure relate to vacuum-assisted injection molding of articles.

BACKGROUND

Injection molding is a process that can be used for manufacturing various types of articles. The process generally involves injecting a material into a mold, which shapes the material into articles. Single injection parts may be further processed by moving them to some other mold and/or performing other labor intensive practices.

SUMMARY

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material at the first molding material while the first molding material remains with the first platen or the second platen; sealing a space between the first and second platens; removing a gas from the space while the space is sealed; and closing the mold while the space is sealed.

According to some embodiments, opening the mold by separating the first and second platens includes opening the mold by separating the first and second platens by a first distance. The process may further include closing the mold until the first and second platens are separated by a second distance that is smaller than the first distance, after placing the second molding material at the first molding material.

According to some embodiments, closing the mold while the space is sealed includes joining the first material to the second material. Sealing the space between the first and second platens may include placing a sealing device to cover an opening to the space. Placing a sealing device to cover an opening to the space may include placing a frame that is coupled to at least two gasket rings to cover the opening to the space, wherein a first gasket ring is in contact with the first platen and a second gasket ring is in contact with the second platen.

According to some embodiments, the sealing device may actuate between a first position and a second position, wherein in the first position the sealing device is clear of the injection port, and wherein in the second position, the sealing device seals the space. The sealing device may actuate between the first and second positions by a pneumatic control and/or a hydraulic control.

According to some embodiments, removing a gas from the space while the space is sealed includes creating a vacuum in the space. Sealing a space between the first and second platens may include sealing off an opening to the space.

According to some embodiments, the process further includes closing an injection channel of the mold before placing the second molding material. The process may further include closing the injection channel of the mold by actuating a selective blocking element in the injection channel.

According to some embodiments, the process further includes placing at least one centering pin through at least one hole in the second molding material. The process may further include resting at least one centering pin in at least one pin hole.

A molding process according to one embodiment of the present disclosure includes injecting a first molding material into a mold cavity of a mold, the mold cavity formed by at least a mold cavity portion of a first platen and a second platen when the first platen is in contact with the second platen; opening the mold by separating the first and second platens; placing a second molding material between the first and second platens while the first molding material remains between the first and second platens; sealing a space between the first and second platens while the first and second molding materials remain between the first and second platens; removing a gas from the space while the space is sealed; and closing the mold while the space is sealed.

A molding system according to one embodiment of the present disclosure includes a mold, the mold including a first platen, a second platen and a mold cavity, the mold cavity formed by at least a mold cavity portion of a first platen and a second platen when the first platen is in contact with the second platen; a sealing device that is configured to seal a space between the first and second platens; and a gas remover that is configured to remove a gas from the space between the first and second platens while the space is sealed.

According to some embodiments, the molding system further includes means for injecting a first molding material into the mold cavity, means for opening the mold by separating the first and second platens, and means for placing a second molding material between the first and second platens while the first molding material remains with the first platen or the second platen.

According to some embodiments, the sealing device may include an actuator. The actuator may include at least one dual cylinder. The sealing device may include a frame that is coupled to at least two gasket rings. The at least two gasket rings may include silicon. In some embodiments, the actuator may be a pneumatic control system and/or a hydraulic control system.

According to some embodiments, at least one of the first platen and the second platen includes a selective blocking element configured to selectively block an injection channel in the mold. The selective blocking element may be mechanically actuated.

According to some embodiments, at least one of the first platen and the second platen includes an overflow channel, at least one centering pin, and/or at least one pin hole.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

Figure 1:
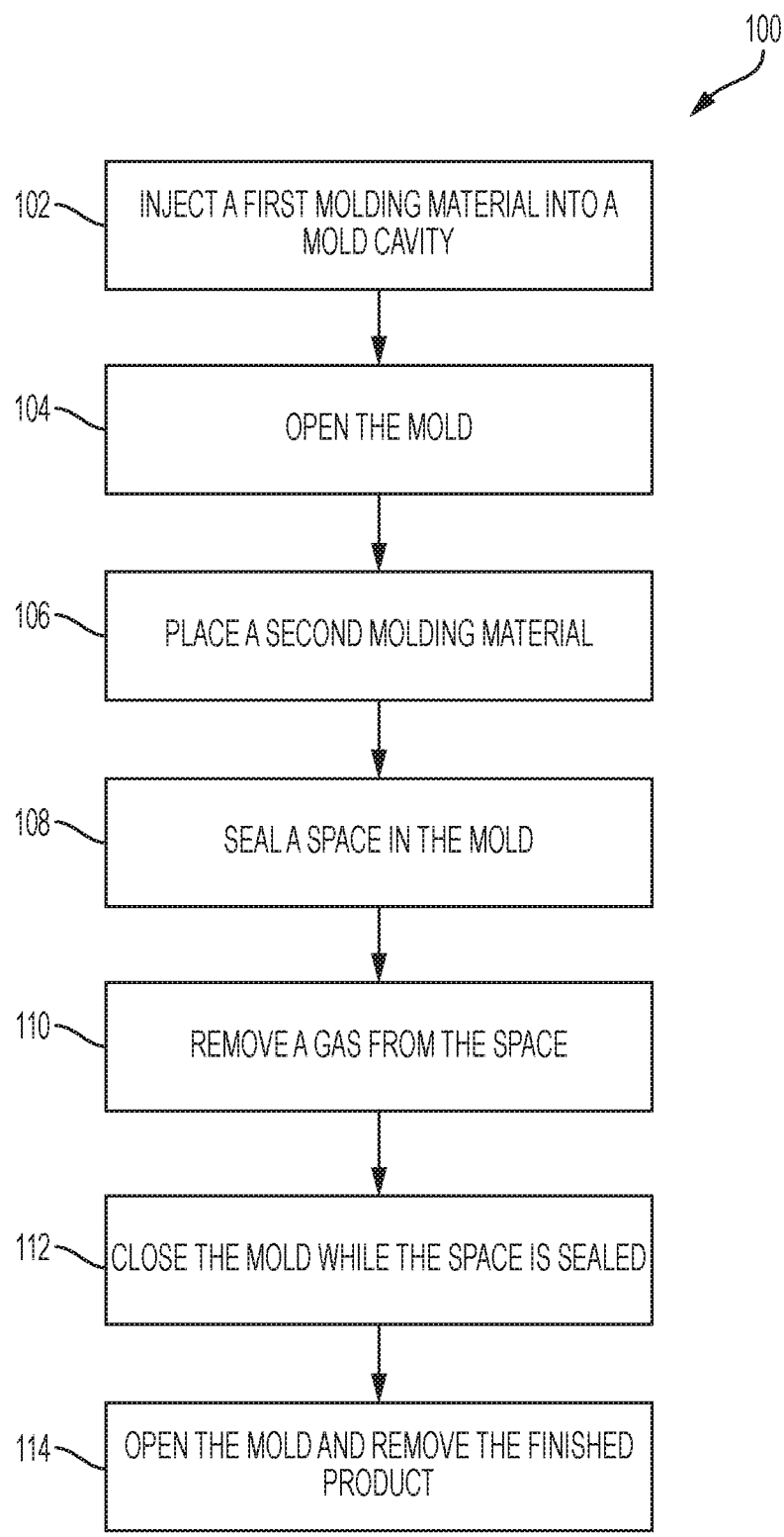
FIG. 1 illustrates an exemplary process for manufacturing a product of a molding system according to embodiments of the present disclosure.

FIG. 1 illustrates an exemplary process for manufacturing one or more products of a molding system. Products of the molding system manufactured according to the method 100 comprise two molding materials. Examples of these products include footwear, toys, sporting goods, eyewear, medical supplies, kitchenware, auto parts, furniture, or any other product that may be manufactured using a molding system.

Figure 2:
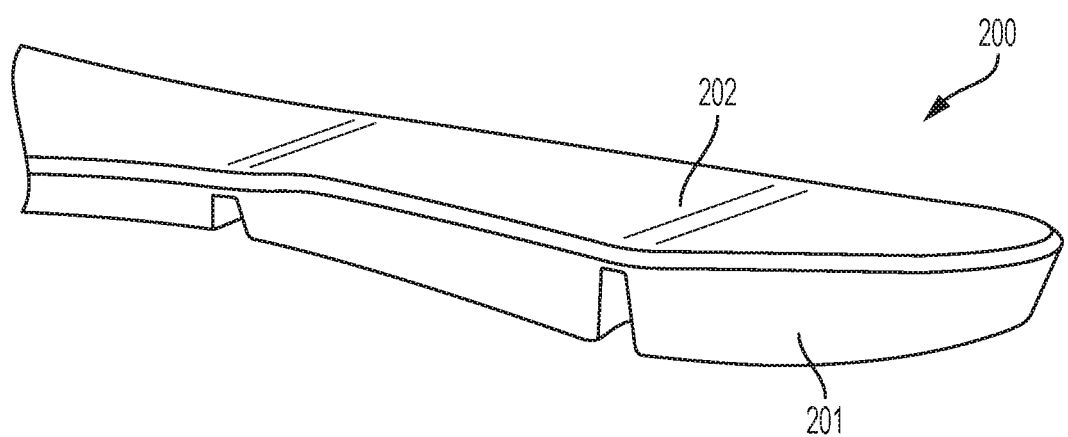
FIG. 2 illustrates a partial perspective view of an exemplary product of a molding system.

FIG. 2 illustrates an exemplary product, an insole 200, of the molding system. The insole 200 comprises a first molding material 201 and a second molding material 202. Although not required, the first molding material 201 and second molding material 202 may be different in terms of at least one of their characteristics such as the shape, color, texture, dimension, composition, or any other characteristic. For example, the first molding material 201 is purple-colored ethylene vinyl acetate (EVA), while the second molding material 202 is yellow-colored EVA and is thinner than the first molding material 201. In other embodiments, the first molding material 201 may be EVA, while the second molding material 202 may be a non-EVA material.

Figure 3:
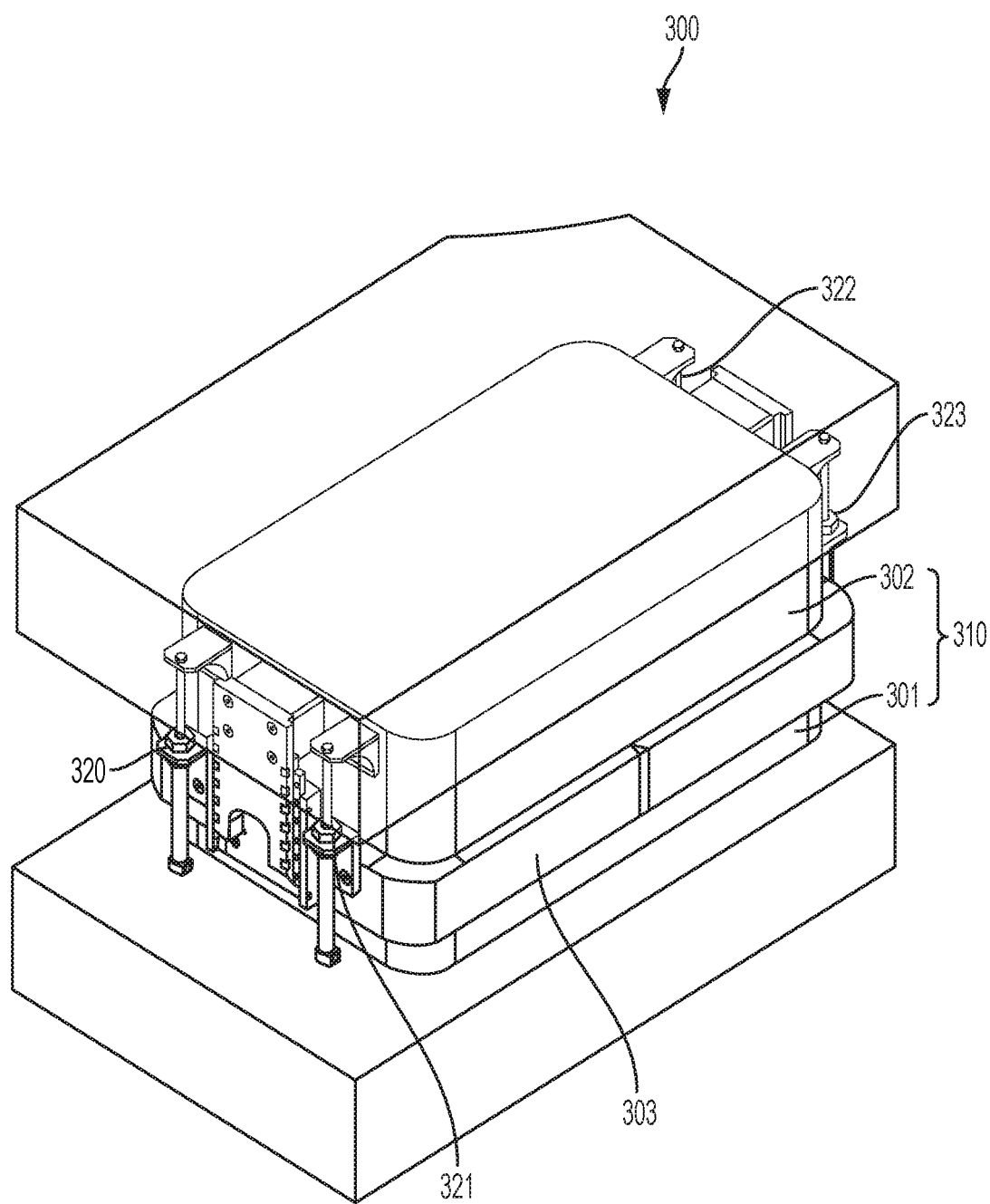
FIG. 3 illustrates a schematic of an exemplary molding system.

FIG. 3 illustrates a schematic of an exemplary molding system 300 for manufacturing a product. A molding system 300 includes a mold 310, which comprises a first platen 301 and a second platen 302. The molding system 300 may be used to produce the insole 200.

Figure 4:
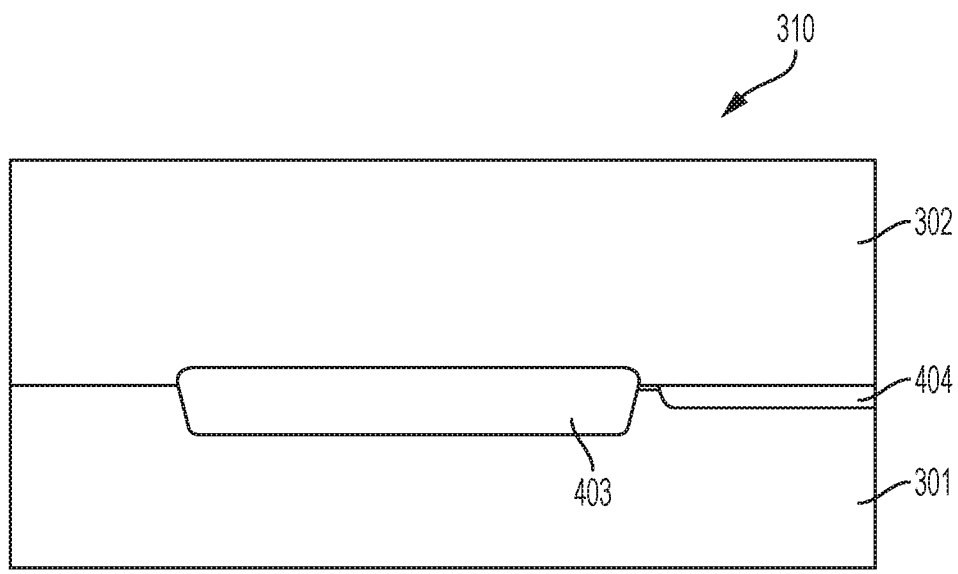
FIG. 4 illustrates a schematic of an exemplary mold which may be a part of the exemplary molding system in FIG. 3, wherein the mold is closed.

FIG. 4 illustrates a cross-sectional schematic of an exemplary mold 310 which may be a part of the exemplary molding system 300 as shown in FIG. 3. In some embodiments, the mold 310 consists of a first platen 301 and a second platen 302. In FIG. 4, the first platen 301 is located at the bottom and the second platen 302 is located at the top. However, in some embodiments, the first platen 301 is located next to the second platen 302 in a vertical arrangement.

FIG. 4 illustrates a mold with two platens. In other embodiments, the number of platens in a mold is greater than two. A plurality of platens may be placed horizontally, vertically, or in any other possible arrangement to form a mold.

FIG. 4 illustrates a mold cavity 403. The mold cavity 403 defines the shape of a product that is manufactured using the mold 310. The mold cavity 403 is formed by at least a mold cavity portion of a first platen 301 and a second platen 302 when the first platen 301 is in contact with the second platen 302. Generally, when a molding material is inserted into the molding cavity 403 and is cured, a product of the molding system is manufactured in the shape of the mold cavity 403.

At block 102, the method 100 involves injecting a first molding material into the mold cavity 403. The first molding material is generally in an uncured form. The molding system 300 cures the molding material. During the curing process, the molding material usually goes through a solidification process. FIG. 2 illustrates an exemplary first molding material 201 of the insole 200 after the first molding material has been cured.

Generally, the first molding material is inserted into the mold 310 through an outer opening 404 while the mold 310 is closed. The mold 310 is closed when the first platen 301 is in contact with the second platen 302 as shown in FIG. 4. In some embodiments, when the mold 310 is closed, the mold cavity 403 may be externally accessed through the opening 404 and not through a seal (e.g. as sealed by a sealing ring 303, which will be described further below). In some embodiments, when the mold 310 is closed, an exchange of a gas between inside and outside the mold cavity occurs through the opening 404 and not through the seal. In other embodiments, when the mold 310 is closed, an exchange of a gas between inside and outside the mold cavity occurs primarily through the opening 404.

Figure 5:
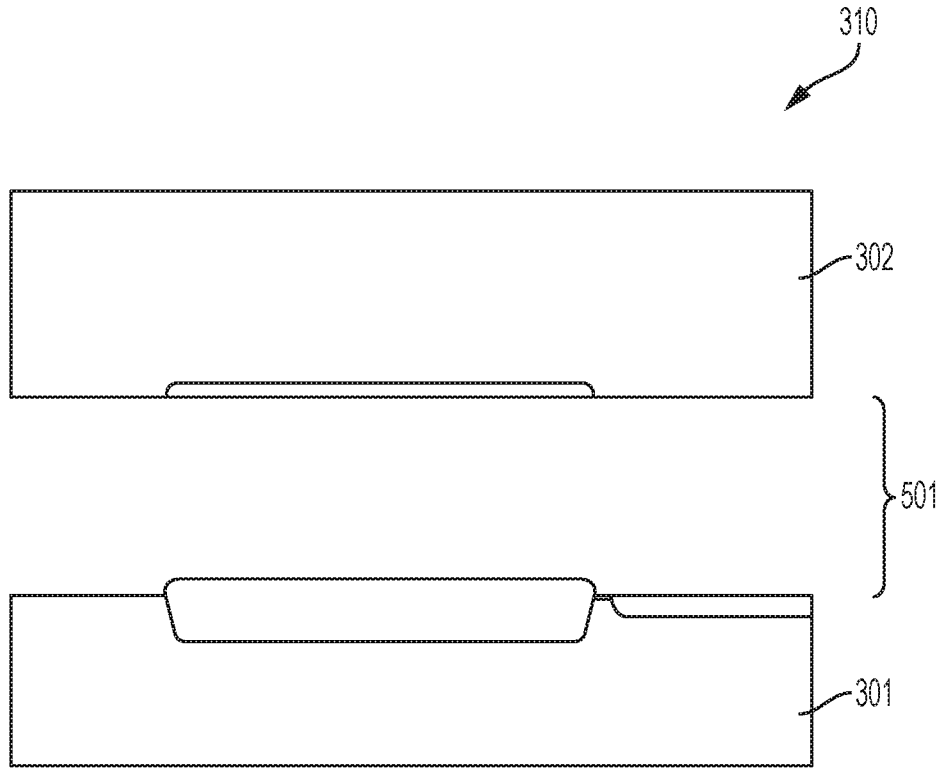
FIG. 5 illustrates a schematic of an exemplary mold which may be a part of the exemplary molding system in FIG. 3, wherein the mold is open.

At block 104, the method 100 involves opening the mold 310. In some embodiments, the mold 310 is open if the first platen 301 is not in contact with the second platen 302 as shown in FIG. 5. In some embodiments, a distance 501 between the first platen 301 and the second platen 302 may or may not vary from one opening of the mold 310 to another opening of the mold 310. The mold 310 may be opened manually by at least one person, automatically by at least one machine, or semi-automatically by at least one person and at least one machine.

Figure 6:
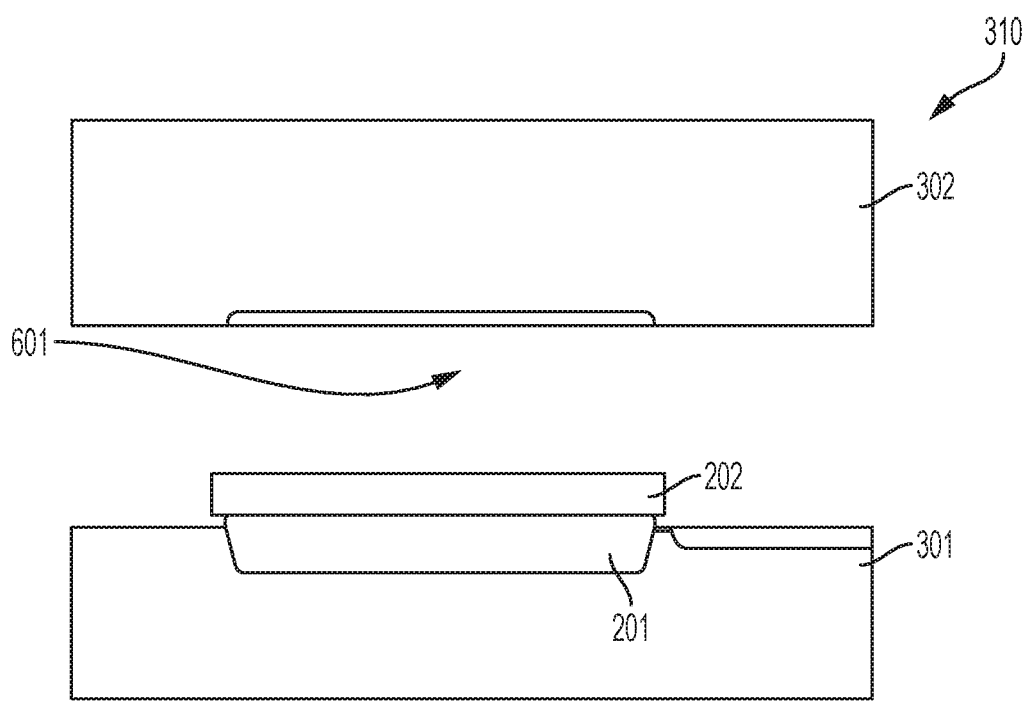
FIG. 6 illustrates a schematic of an exemplary mold which may be a part of the exemplary molding system in FIG. 3, wherein the mold is open and two molding materials are inside the mold.

At block 106, the method 100 involves placing the second molding material 202 through the space between the first platen 301 and the second platen 302 as shown in FIG. 6. The second molding material 202 is placed at the first molding material 201 while the first molding material 201 remains with the first platen 301 as shown in FIG. 6. In some embodiments, the second molding material can be in a cured form.

In some embodiments, the second molding material 202 is placed on top of the first molding material 201 as shown in FIG. 6. FIG. 6 shows the second molding material 202 covering the entire top surface of the first molding material 201. An exemplary product of a molding system made from this setting is the insole 200 in FIG. 2. In some embodiments, the second molding material 202 may cover less than the entire top surface of the first molding material 201. In other embodiments, the second molding material may cover at least some portion of one or more sides of the first molding material 201.

At block 108, the method 100 involves sealing a space 601 in the mold 310 between the first platen 301 and the second platen 302 as shown in FIG. 6. The space 601 includes the space representing the mold cavity 403 which is shown in FIG. 4. When the first platen 301 is not in contact with the second platen 302, the space 601 is larger than the space occupied by the mold cavity 403. In other words, if the mold 310 is open, the volume of the space 601 is larger than the volume of the mold cavity 403.

Figure 7:
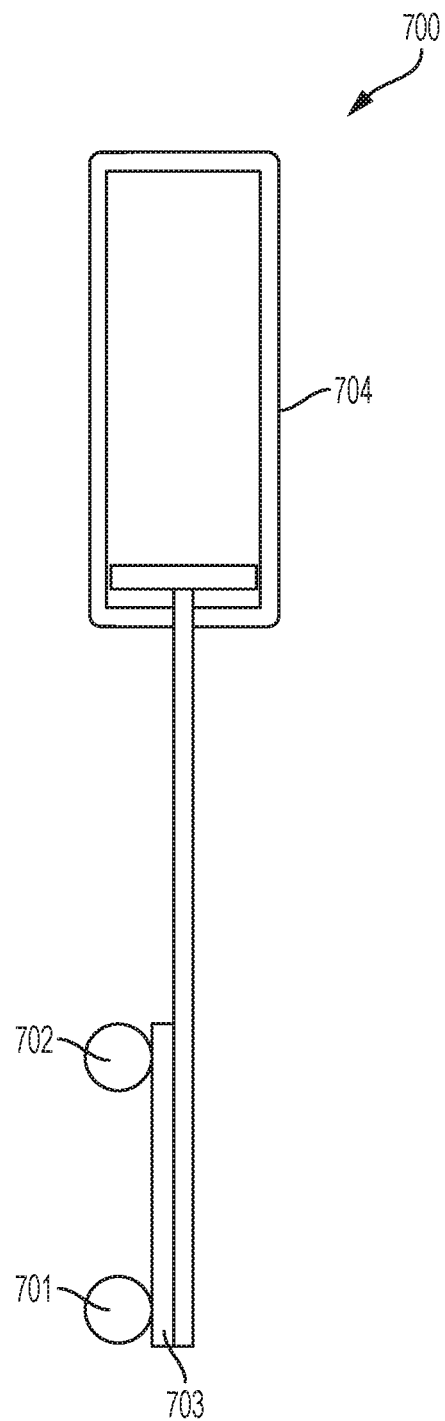
FIG. 7 illustrates a schematic of an exemplary sealing device which may be a part of the exemplary molding system in FIG. 3.

In some embodiments, the space 601 is sealed using a sealing device 700 as shown in FIG. 7. The sealing device 700 comprises a first gasket 701 and a second gasket 702. In some embodiments, a gasket may be manufactured using a heat-resistant material, such as silicon. The first gasket 701 and the second gasket 702 are coupled to a frame 703. The frame 703 is coupled to an actuator. In some embodiments, the actuator can be a pneumatic control system 704 or a hydraulic control system. The pneumatic control system 704 or hydraulic control system is actuated to move the frame 703, which in turn moves the first gasket 701 and the second gasket 702. The first gasket 701 and the second gasket 702 may move in a certain direction—for example, up and down in a vertical direction. In other embodiments, the space 601 is sealed using an alternative sealing device, for example foam, adhesive, sealant, a baffle or sleeve, and/or the like. Alternative sealing devices may be coupled to different types of actuators. An example of an actuator is a pneumatic control system 704. Another example of an actuator is a hydraulic control system. As used herein, "sealed" is used in its broadest sense to refer to an arrangement that deters, minimizes, or reduces the passage or flow of gas into the mold cavity 403 or the space 601 from outside the mold 310.

As shown in FIG. 3, in some embodiments, the molding system 300 comprises a plurality of actuators, each of which may comprise at least two gaskets. FIG. 3 shows the molding system 300 with four pneumatic control systems (320, 321, 322, and 323). In some embodiments, these pneumatic control systems are coupled to a sealing ring 303 as shown in FIG. 3. The pneumatic control systems 320, 321, 322, and 323 may be used to place the sealing ring 303 to cover the lining between the first platen 301 and the second platen 302. The sealing ring 303 is used to ensure that the space 601 inside the mold 310 is sealed to deter, minimize, or reduce any entrance of gas (e.g. air) into the mold cavity 403 or the space 601 from outside the mold 310.

Figure 8:
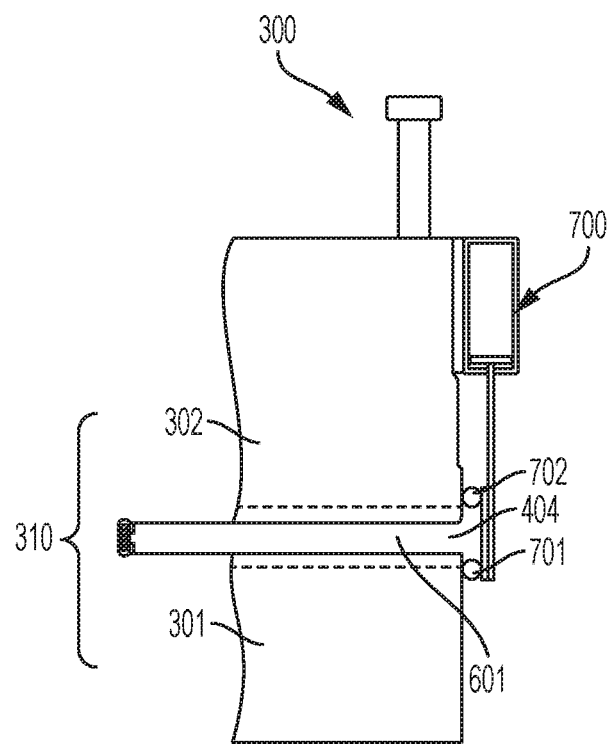
FIG. 8 illustrates a cross-sectional schematic of the exemplary molding system in FIG. 3 with the exemplary sealing device in FIG. 7.

FIG. 8 illustrates an exemplary cross-sectional schematic of the position in which the sealing device 700 is used to seal the space 601 when the first platen 301 is not in contact with the second platen 302. The space 601 is sealed when a gas exchange between inside the space 601 and outside the space 601 is deterred, minimized, or reduced. By covering the opening 404, the space 601 may be hermetically or substantially sealed. In some embodiments, the space 601 is sealed by placing the first gasket 701 in contact with the first platen 301, and the second gasket 702 in contact with the second platen 302.

At block 110, the method 100 involves removing a gas from the space 601. In some embodiments, the gas is removed by at least one gas remover that is coupled to the space 601. In some embodiments, removing the gas creates a vacuum in the space 601. When the gas is removed from the space 601, any pocket of gas inside the first molding material 201 or the second molding material 202, or any pocket of gas between the first molding material 201 and the second molding material 202 may be reduced or eliminated.

Removing the gas from the space 601 helps to prevent any pocket of gas from being formed inside the first molding material 201 or the second molding material 202, or between the first molding material 201 and the second molding material 202, when the mold 310 closes.

The mold 310 closes when the distance 501 between the first platen 301 and the second platen 302 becomes shorter. In some embodiments, the mold is considered closed when the distance 501 is zero.

Figure 9:
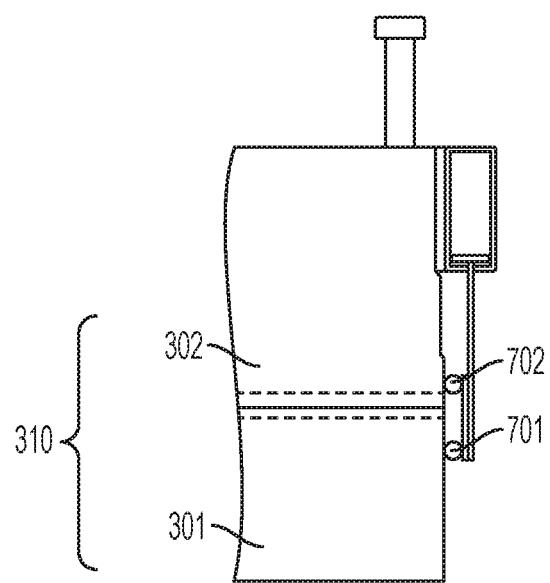
FIG. 9 illustrates a cross-sectional schematic of the exemplary molding system in FIG. 3 with the exemplary sealing device in FIG. 7.

At block 112, the method 100 involves closing the mold 310 while the space 601 is sealed. As used herein, "closing" is used to refer to when the distance between platens (e.g. platens comprising the first platen 301 and the second platen 302) is decreasing, or when the volume of a space between platens (e.g. the space 601) is decreasing. In some embodiments, the mold 310 is closed by placing the first platen 301 in contact with the second platen 302 while the first gasket 701 is in contact with the first platen 301 and the second gasket 702 is in contact with the second platen 302, as shown in FIG. 9. In some embodiments, when the mold 310 is closed, the second molding material 202 attaches to the first molding material 201.

Figure 10:
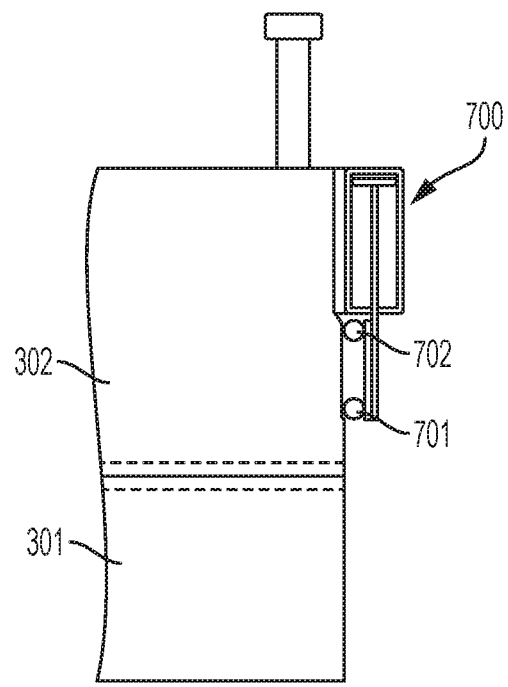
FIG. 10 illustrates a cross-sectional schematic of the exemplary molding system in FIG. 3 with the exemplary sealing device in FIG. 7.

In some embodiments, the sealing device 700 returns to a position in which the first gasket 701 is no longer in contact with the first platen 301 as shown in FIG. 10.

Figure 11:
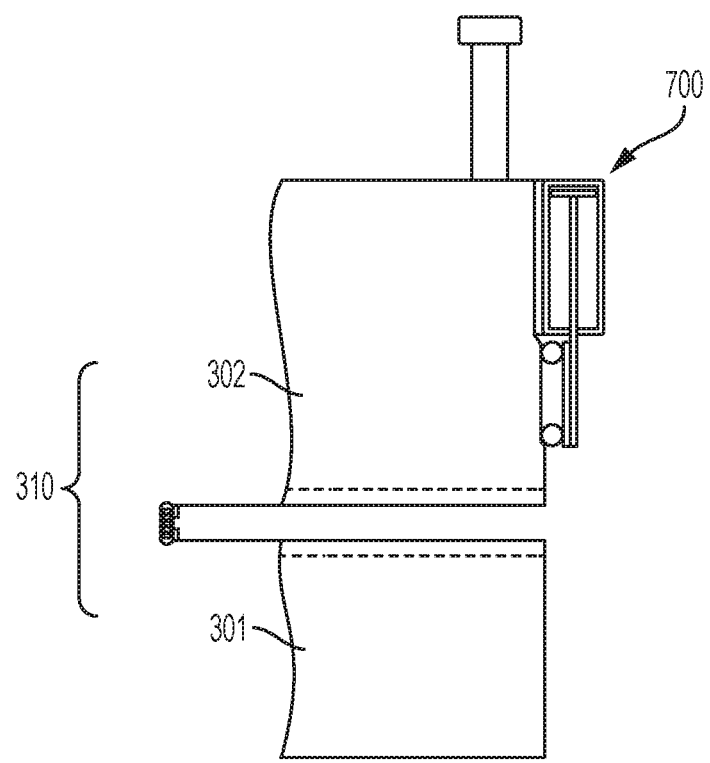
FIG. 11 illustrates a cross-sectional schematic of the exemplary molding system in FIG. 3 with the exemplary sealing device in FIG. 7.

At block 114, the method 100 involves opening the mold 310 and removing the finished product. FIG. 11 shows a cross-sectional schematic of the position of the mold 310 and the sealing device 700 when the mold is open.

Embodiments of the present disclosure also permit a product of the molding system 300 to be manufactured with a single molding material, or with more than two molding materials. Such embodiments can be implemented by modifying the method 100.

Figure 12:
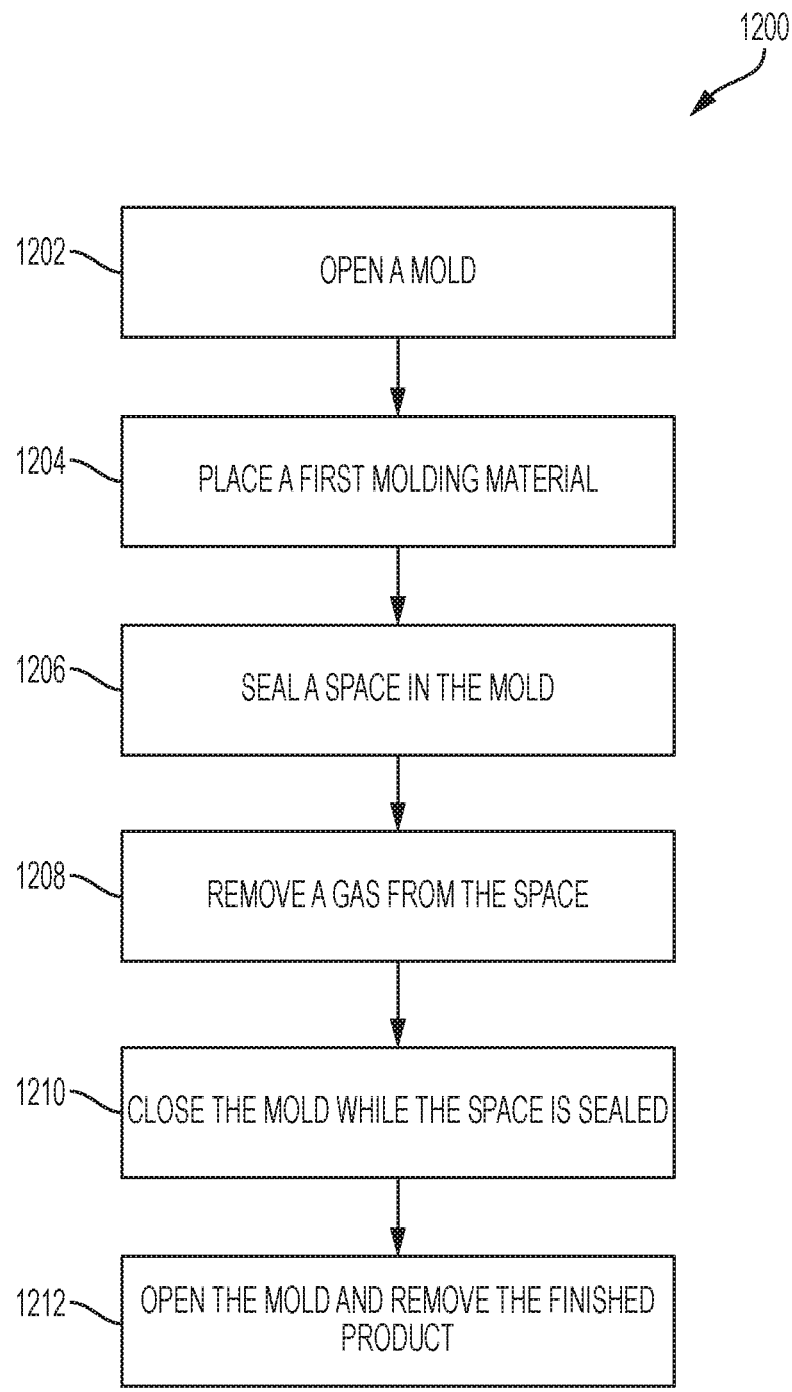
FIG. 12 illustrates an exemplary process for manufacturing a product of a molding system according to embodiments of the present disclosure.
Figure 13:
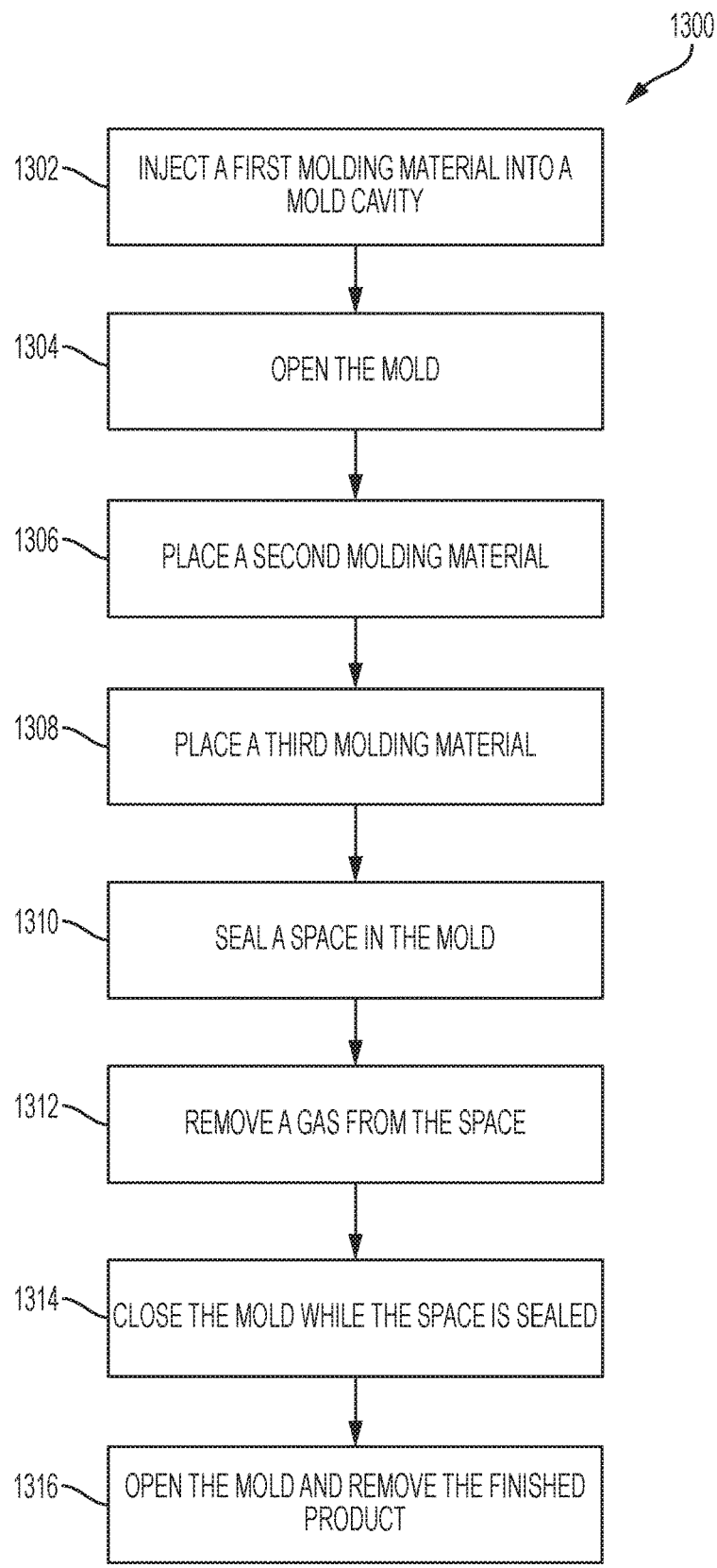
FIG. 13 illustrates an exemplary process for manufacturing a product of a molding system according to embodiments of the present disclosure.
Figure 14:
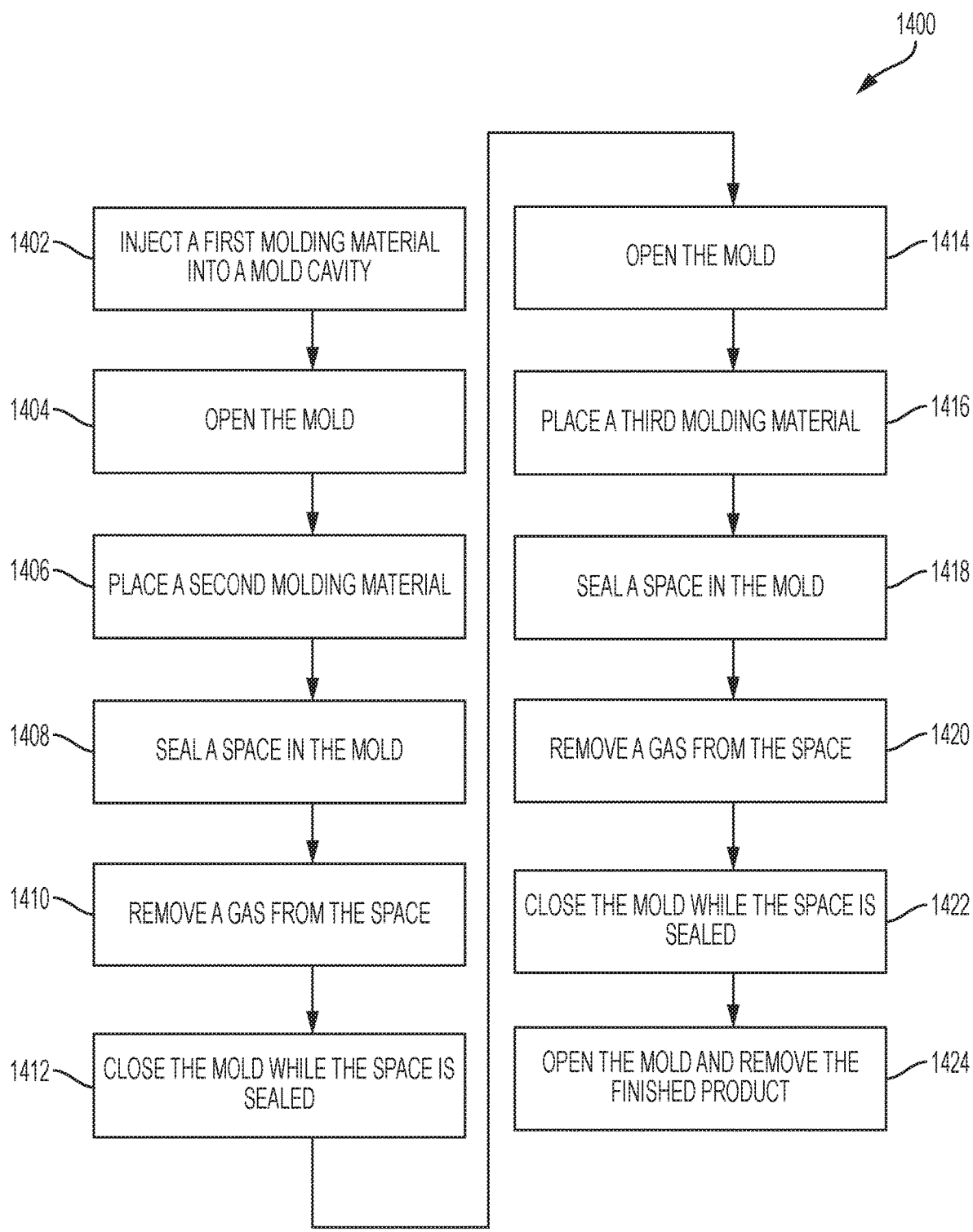
FIG. 14 illustrates an exemplary process for manufacturing a product of a molding system according to embodiments of the present disclosure.

FIGS. 12, 13, and 14 illustrate exemplary processes for manufacturing one or more products of a molding system.

FIG. 12 illustrates a method 1200. Products of the molding system manufactured according to the method 1200 comprise one molding material. The method 1200 includes opening a mold (block 1202). For example, the mold is open if the first platen is not in contact with the second platen, as described above with respect to FIG. 5. A material may be placed into the mold (block 1204). A space in the mold is sealed (block 1206). For example, the space may be sealed by using a sealing device, as described above with respect to FIG. 8. A gas from the space is removed (block 1208). While the space is sealed, the mold is closed (block 1210). For example, the mold may be closed by placing the first platen in contact with the second platen while the space is sealed, as described above with respect to FIG. 9. The mold is opened and the finished product is removed (block 1212).

FIG. 13 illustrates a method 1300. Products of the molding system manufactured according to the method 1300 comprise three molding materials. The method 1300 includes injecting a first molding material into a mold cavity (block 1302). For example, the first molding material may be injected through an outer opening while the mold is closed, as described above. An example of a closed mold is shown in FIG. 4. The mold is opened (block 1304). For example, the mold is open if the first platen is not in contact with the second platen, as described above with respect to FIG. 5. A second molding material is placed into the mold (block 1306). For example, the second molding material may be placed through the space between two platens, as described above with respect to FIG. 6. A third molding material is placed into the mold (block 1308). For example, the third molding material may be placed through the space between two platens similar to the way the second molding material was placed in block 1306 above. A space in the mold is sealed (block 1310). For example, the space may be sealed by using a sealing device, as described above with respect to FIG. 8. A gas from the space is removed (block 1312). While the space is sealed, the mold is closed (block 1314). For example, the mold may be closed by placing the first platen in contact with the second platen while the space is sealed, as described above with respect to FIG. 9. The mold is opened and the finished product is removed (1316).

FIG. 14 illustrates a method 1400. Products of the molding system manufactured according to the method 1400 comprise three molding materials. The method 1400 includes injecting a first molding material into a mold cavity (block 1402). For example, the first molding material may be injected through an outer opening while the mold is closed, as described above. An example of a closed mold is shown in FIG. 4. The mold is opened (block 1404). For example, the mold is open if the first platen is not in contact with the second platen, as described above with respect to FIG. 5. A second molding material is placed into the mold (block 1406). For example, the second molding material may be placed through the space between two platens, as described above with respect to FIG. 6. A space in the mold is sealed (block 1408). For example, the space may be sealed by using a sealing device, as described above with respect to FIG. 8. A gas from the space is removed (block 1410). While the space is sealed, the mold is closed (block 1412). For example, the mold may be closed by placing the first platen in contact with the second platen while the space is sealed, as described above with respect to FIG. 9. The mold is opened (block 1414). For example, the mold is open if the first platen is not in contact with the second platen, as described above with respect to FIG. 5. A third molding material is placed into the mold (block 1416). For example, the third molding material may be placed through the space between two platens similar to the way the second molding material was placed in block 1406 above. A space in the mold is sealed (block 1418). For example, the space may be sealed by using a sealing device, as described above with respect to FIG. 8. A gas from the space is removed (block 1420). While the space is sealed, the mold is closed (block 1422). For example, the mold may be closed by placing the first platen in contact with the second platen while the space is sealed, as described above with respect to FIG. 9. The mold is opened and the finished product is removed (1424).

Using various combinations of the blocks in FIGS. 1, 12, 13, and 14, products of a molding system may be manufactured with one, two, three, four, or any other number of molding materials.

Figure 21:
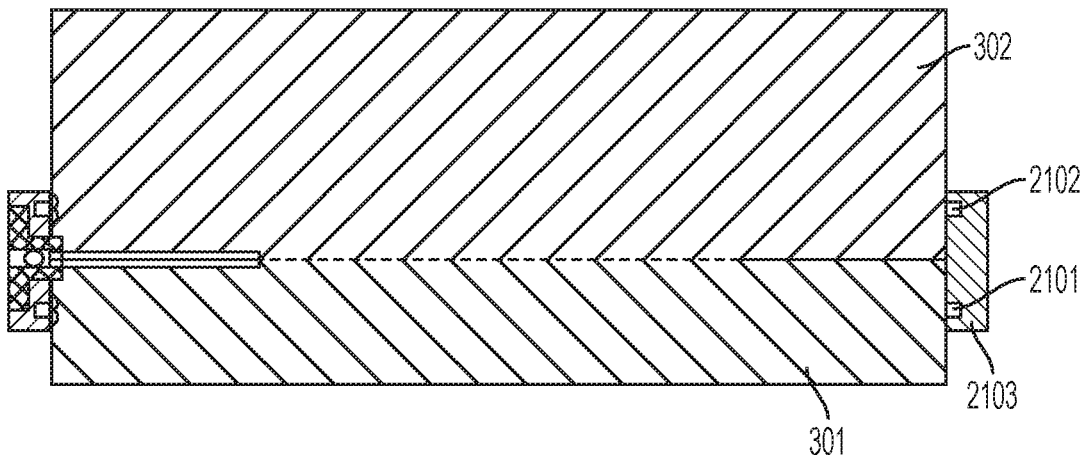
FIG. 21 illustrates an exemplary sealing device that is in a fixed position relative to a platen.
Figure 22:
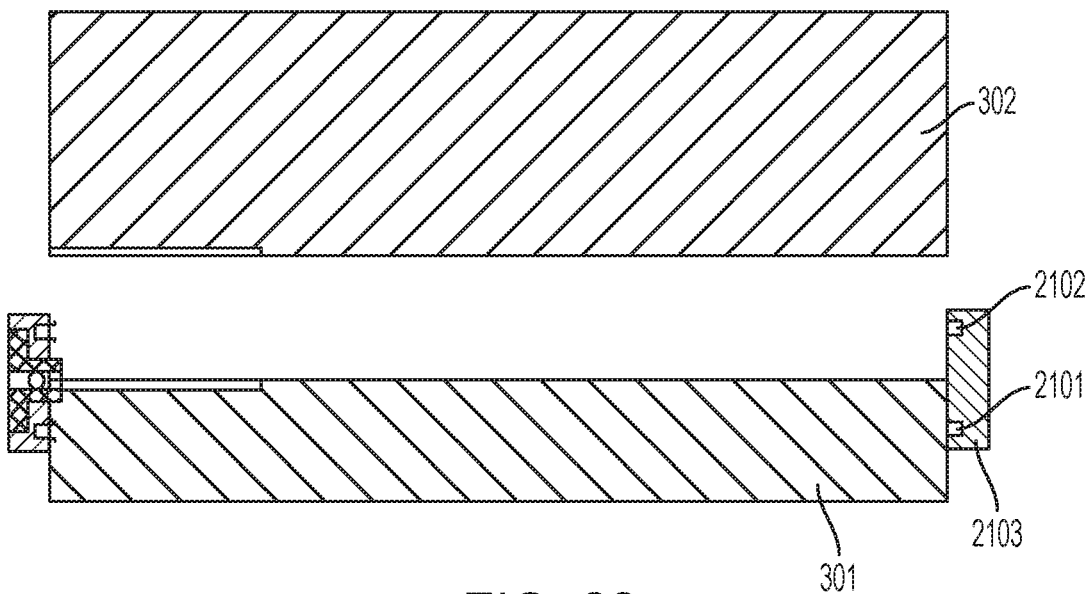
FIG. 22 illustrates an exemplary sealing device that is in a fixed position relative to a platen.

FIGS. 21-22 illustrate an exemplary sealing device that is in a fixed position relative to a platen. In some embodiments, the sealing device comprises a first gasket 2101 and a second gasket 2102. In some embodiments, the first gasket 2101 and the second gasket 2102 are coupled to a frame 2103. In some embodiments, the frame 2103 is fixed to a platen. For example, FIG. 21 illustrates a closed mold with the first platen 301 and the second platen 302, in which the frame 2103 is fixed to the first platen 301. FIG. 22 illustrates the mold when it is open. In some embodiments, no actuator is coupled to the frame 2103. In some embodiments, the frame 2103 can be fixed to the second platen 302 instead of the first platen 301. This exemplary sealing device can provide the same or similar sealing capability as other sealing devices discussed herein. Moreover, this exemplary sealing device can be used in conjunction with, or as a replacement for, other sealing devices discussed herein.

Figure 15:
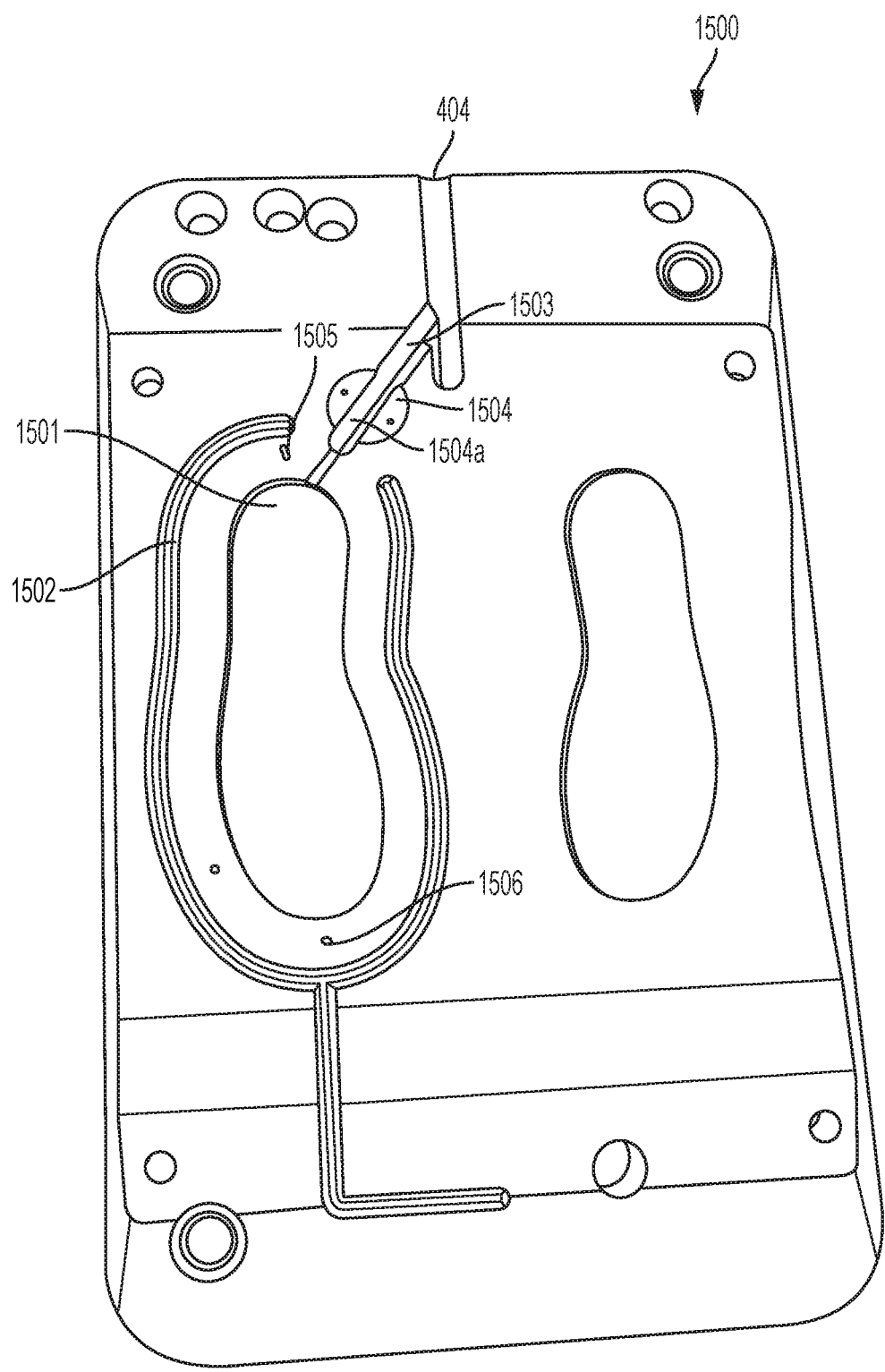
FIG. 15 illustrates an exemplary platen of a molding system.
Figure 16:
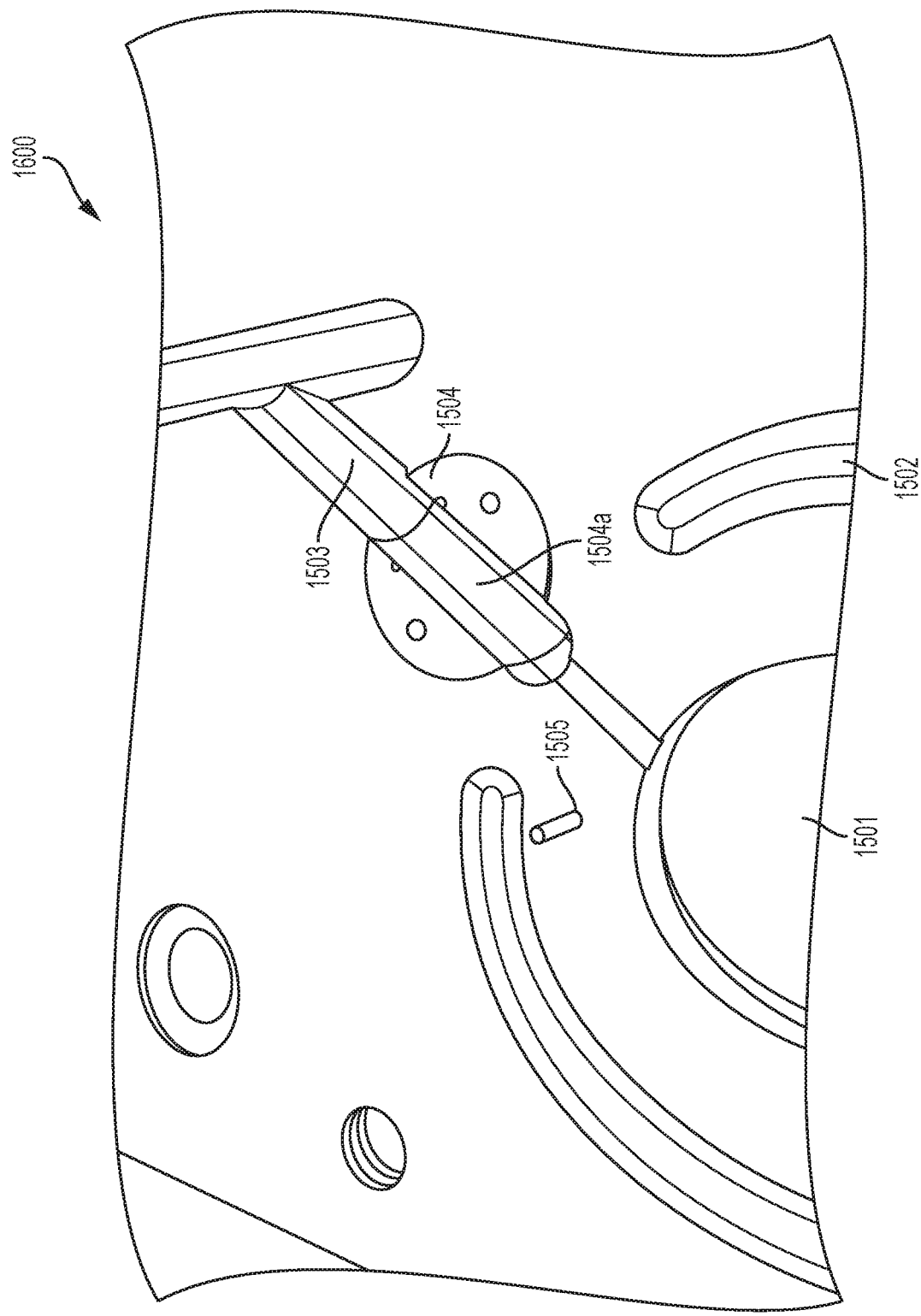
FIG. 16 illustrates a close-up view of a portion of the exemplary platen in FIG. 15.

FIG. 15 illustrates an exemplary platen 1500. The platen 1500 can be an embodiment of the first platen 301 or the second platen 302, which is shown schematically in FIG. 3. In some embodiments, the platen 1500 comprises an opening 404, a mold cavity portion 1501, and an injection channel 1503. A close-up view of the mold cavity portion 1501 and the injection channel 1503 is shown in FIG. 16. In some embodiments, while the mold is closed, a molding material can be injected into the opening 404 of a mold comprising a plurality of platens, at least one of which can be the mold platen 1500. When the molding material is injected, it can flow through the injection channel 1503 into a mold cavity comprising at least one of the mold cavity portions 1501.

In some embodiments, the platen 1500 can further comprise a rotating system 1504. The rotating system 1504 can comprise an injection channel portion 1504*a*. A close-up view of the rotating system 1504 and the injection channel portion 1504*a* is shown in FIG. 16. The rotating system 1504 can be used to allow, block or partially block a flow of a molding material between the mold cavity and the injection channel 1503. The rotating system 1504 can be rotatable within the platen 1500. In some embodiments, the rotating system 1504 can be rotated 360 degrees or less in a clockwise and/or counterclockwise direction.

In some embodiments, the rotating system 1504 can be rotated into a position, where the injection channel portion 1504*a* is aligned or substantially aligned with the injection channel 1503 such that the rotating system 1504 can allow a molding material to flow between the mold cavity and the injection channel 1503. In these embodiments, the rotating system 1504 can be said to be open or in an open mode. For example, the platen 1500, as shown in FIG. 15, shows the rotating system 1504 in an open mode.

In some embodiments, the rotating system 1504 can be rotated into a position, where the injection channel portion 1504*a* is neither aligned nor substantially aligned with the injection channel 1503 but the rotating system 1504 can still allow a molding material to flow between the mold cavity and the injection channel 1503. In these embodiments, the rotating system 1504 can be said to be partially open or in a partially-open mode. In some embodiments, the rotating system 1504 in the partially-open mode can partially block the flow of the molding material between the mold cavity and the injection channel 1503; consequently, the speed at which the molding material flows and/or the volume of the molding material that flows can be limited.

In some embodiments, the rotating system 1504 can be rotated into a position such that the rotating system 1504 does not allow a molding material to flow between the mold cavity and the injection channel 1503. For example, the rotating system 1504 does not allow the molding material to flow by blocking the flow. In these embodiments, the rotating system 1504 can be said to be closed or in a closed mode.

Operations associated with the rotating system 1504 can be integrated into various processes for manufacturing a product of a molding system, such as processes shown in FIGS. 1, 13, and 14. For example, before any molding material is injected into a mold, the rotating system 1504 can be open if it is not already open. After a first molding material has been injected into a mold cavity (e.g. block 102 in FIG. 1) but before placing a second molding material (e.g. block 106 in FIG. 1), the rotating system 1504 can be closed. The second molding material can then be placed at the first molding material (e.g. block 106 in FIG. 1). By closing the rotating system 1504 before the second molding material is placed, any excess molding material in the mold cavity is prevented from flowing into the injection channel 1503 towards the opening 404.

In some embodiments, the rotating system 1504 can be manually controlled. For example, after the first molding material has been injected into the mold cavity and the mold has been open, one or more persons can manually (e.g. using fingers) cause the rotating system 1504 to rotate. In other embodiments, the rotating system 1504 can be automatically controlled. For example, the rotating system 1504 can be coupled to an actuator. In some embodiments, the actuator is an electronic motor, for example a solenoid and/or step motor, that enables, and/or mechanically actuates, the rotating system 1504 to rotate in a clockwise and/or counter-clockwise direction. In some embodiments, the actuator can be programmed to automatically control the rotating system 1504. For example, the rotating system 1504 can be programmed to be open before a first molding material is inserted into the mold cavity (e.g. before block 102 in FIG. 1), and the rotating system 1504 can be programmed to be closed after the first molding material is inserted into the mold cavity (e.g. after block 102 in FIG. 1). In some embodiments, the rotating system 1504 can be both manually and automatically controlled. In some embodiments, the actuation of the rotating system is pneumatic. In some embodiments, the actuation of the rotating system is tied to the actuation of the opening and/or closing of the mold, and/or the actuation energy for the rotating system 1504 is supplied by the same energy source as the actuation energy for the opening and/or closing of the mold. And although system 1504 is described as a rotating system, one of ordinary skill in the art will appreciate, based on the disclosure provided herein, that the system 1504 may alternatively be a translating/sliding system, a rotating and/or pivoting system, and/or one or a combination of mechanical systems that operate to selectively block and unblock the injection channel. As such, system 1504 may also be referred to as a selective blocking element.

In some embodiments, the platen 1500 further comprises an overflow channel 1502. A close-up view of a portion of the overflow channel 1502 is shown in FIG. 16. In some embodiments, the overflow channel 1502 is located outer to the mold cavity portion 1501. In some embodiments, a molding material from the mold cavity can flow into the overflow channel 1502. For example, in some cases, an excess amount of a first molding material may have been injected into the mold cavity either intentionally or inadvertently. In these cases, when the rotating system 1504 is closed and a second molding material is placed at the first molding material, some or all of the excess amount of the first molding material and/or the second molding material can overflow to the overflow channel 1502 when the mold is closed. The overflow material may result from the first molding material, the second molding material, or a combination of the first and second molding materials, exceeding the volume of the mold cavity portion 1501, according to some embodiments. The overflow channel 1502 permits excess material to gather together for easy trimming and/or removal from the finished molded product. The overflow channel 1502 may extend around all, or a portion, of the mold cavity portion 1501, according to some embodiments.

In some embodiments, the platen 1500 further comprises one or more centering pins for positioning a molding material. FIG. 15 illustrates a first centering pin 1505 and a second centering pin 1506. A close-up view of the first centering pin 1505 is shown in FIG. 16. In some embodiments, a molding material contains one or more holes, each of which can be used to position the molding material in the mold by placing a centering pin through. For example, after a first molding material has been injected into a mold cavity (e.g. block 102 in FIG. 1), a second molding material with two holes can be placed at the first molding material (e.g. block 106 in FIG. 1) by (1) aligning a first hole with the first centering pin 1505 and aligning a second hole with the second centering pin 1506 and (2) placing the first centering pin 1505 through the first hole and placing the second centering pin 1506 through the second hole. The number of holes in a molding material and/or the number of centering pins in a platen can vary (e.g. one, two, three, or more). Also, the specific steps, in which each hole is aligned with and placed through the corresponding centering pin, can vary.

In some embodiments, a molding material can be positioned without using a centering pin in a platen and/or holes in the molding material. For example, a robot can be used to position and place a second molding material at a first molding material (e.g. at block 106 in FIG. 1). In some embodiments, the robot and/or the mold can have a positioning sensor.

FIG. 16 illustrates a close-up view of a portion 1600 of the exemplary platen 1500. The portion 1600 comprises the mold cavity portion 1501, the overflow channel 1502, the injection channel 1503, the rotating system 1504, the injection channel portion 1504*a*, and the first centering pin 1505.

Figure 17:
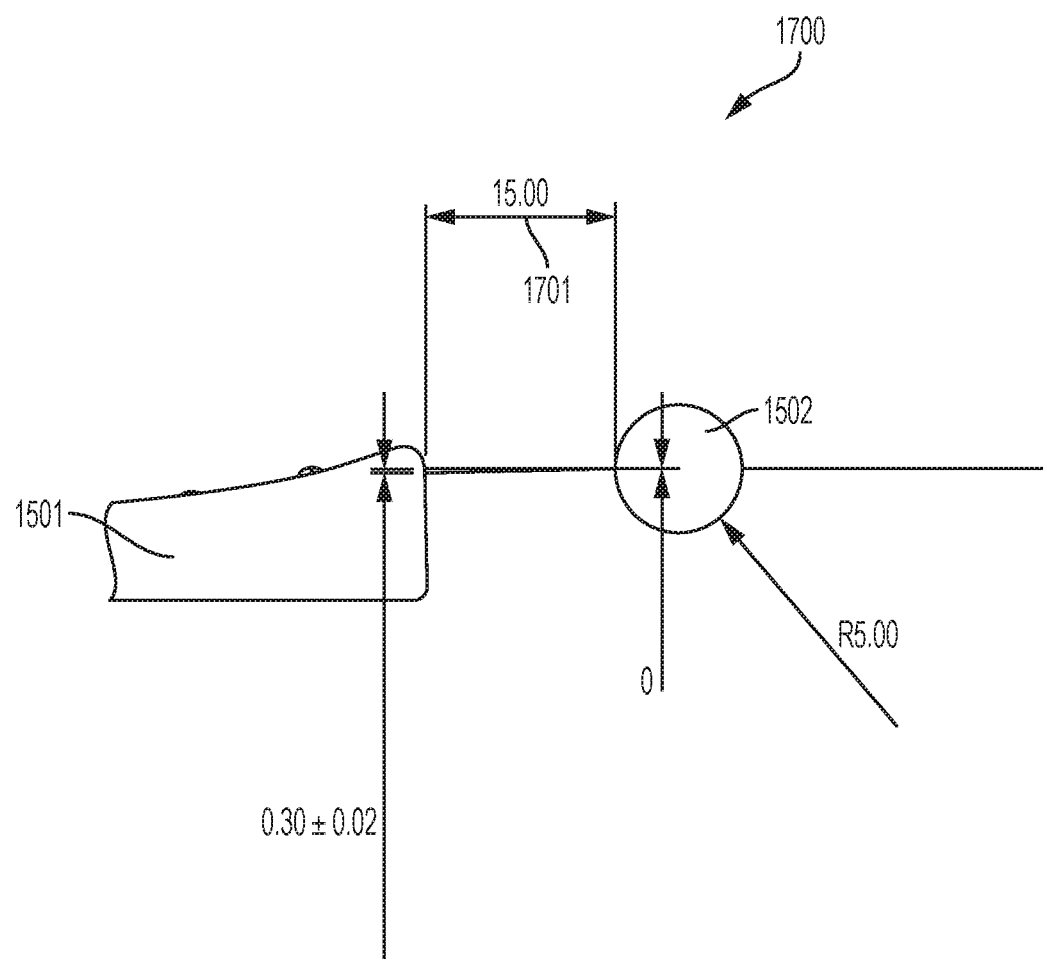
FIG. 17 illustrates a cross-sectional schematic of the exemplary platen.

FIG. 17 illustrates a cross-sectional schematic 1700 of the exemplary platen 1500. In some embodiments, a distance 1701 between the mold cavity portion 1501 and the overflow channel 1502 is constant. For example, FIG. 17 shows that this distance 1701 is 15.00 mm, that the radius of the overflow channel 1502 may be 5.00 mm, and that the opening between the mold cavity portion 1501 and the overflow channel 1502 tapers from an width of 0.30 mm to zero over a distance 1701 plus the radius of the overflow channel 1502, as shown, according to an embodiment of the present disclosure.

Figure 18:
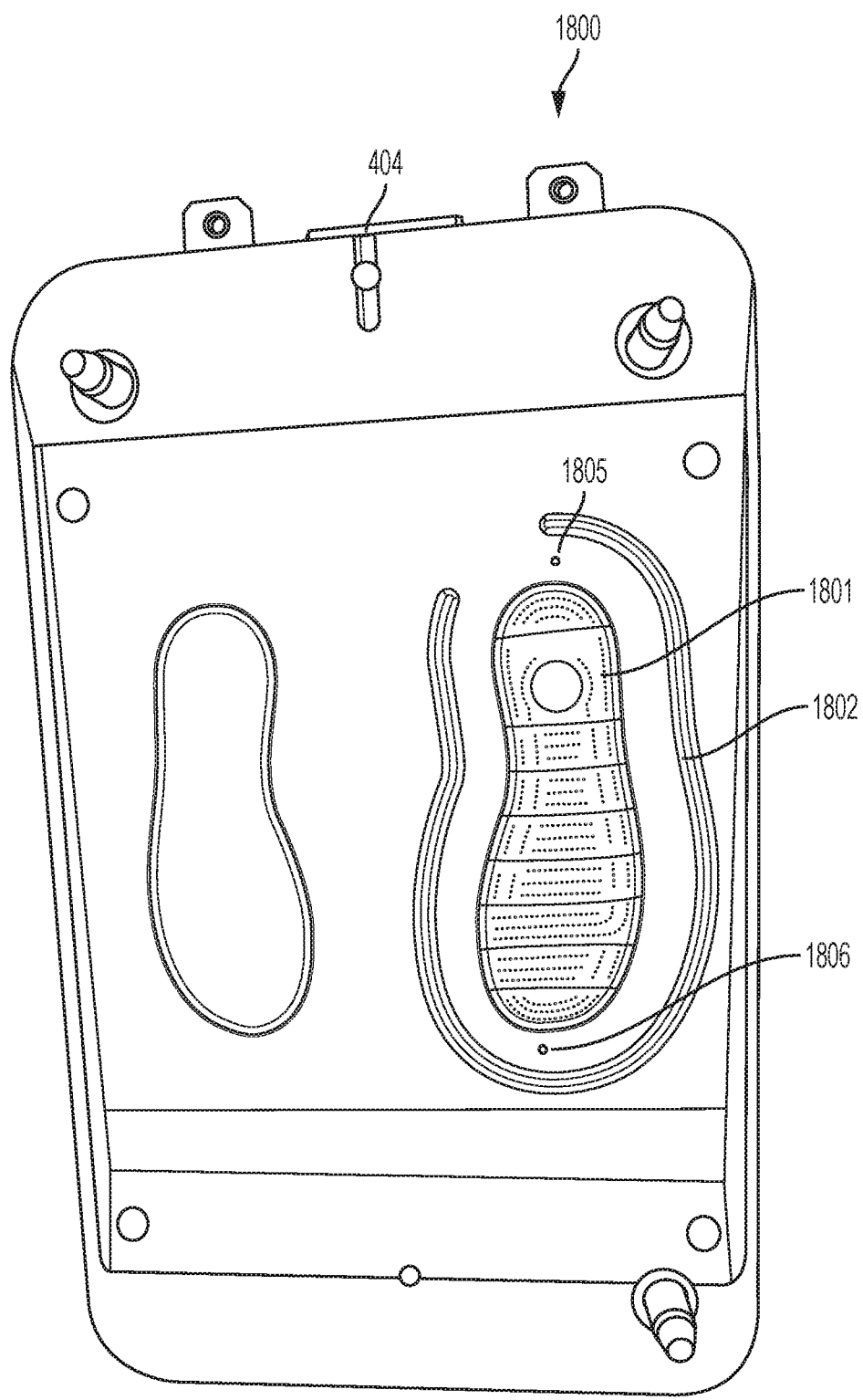
FIG. 18 illustrates an exemplary platen of a molding system.

FIG. 18 illustrates an exemplary platen 1800. The platen 1800 can be an embodiment of the first platen 301 or the second platen 302, which is shown schematically in FIG. 3. In some embodiments, the platen 1800 comprises an opening 404 and a mold cavity portion 1801. In some embodiments, the platen 1800 does not include an injection channel or a rotating system. The platen 1800 can further comprise an overflow channel 1802 that can be aligned with another overflow channel such as the overflow channel 1502. The platen 1800 can further comprise one or more pin holes, through which one or more centering pins from another platen can be placed or rested when the mold is closed. For example, a mold can comprise a bottom platen (e.g. first platen 301 in FIG. 3) and a top platen (e.g. second platen 302 in FIG. 3), where the platen 1500 in FIG. 15 can be the bottom platen, and the platen 1800 can be the top platen. In this example mold, the injection channel 1503 and the rotating system 1504 extend in the bottom platen (i.e. the platen 1500). When the example mold is closed, the first centering pin 1505 rests in the first pin hole 1805, and the second centering pin 1506 rests in the second pin hole 1806. The mold cavity of this example mold comprises the mold cavity portion 1501 of the platen 1500 and the mold cavity portion 1801 of the platen 1800. In some embodiments, when a molding material is positioned without using centering pins (e.g. such as when a robot is used to position a molding material), pin holes such as the first pin hole 1805 and the second pin hole 1806 may not be utilized.

Figure 19:
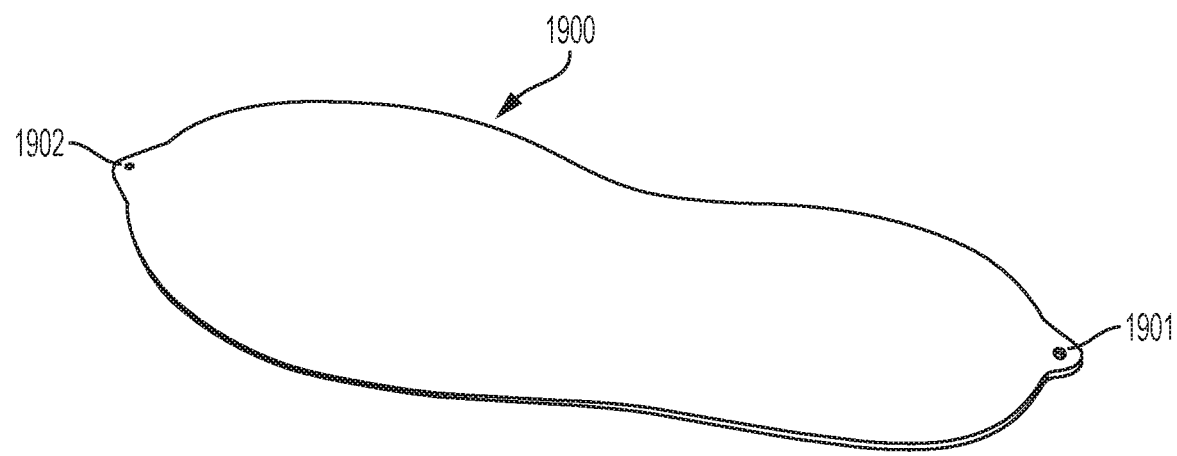
FIG. 19 illustrates an exemplary molding material.

FIG. 19 illustrates an exemplary molding material 1900. In some embodiments, the molding material 1900 can have a first hole 1901 and a second hole 1902. These holes can be used, for example, to position the molding material 1900 in a mold. For example, the molding material 1900 can be a second molding material that is placed at a first molding material (e.g. block 106 in FIG. 1) in a mold that comprises the platen 1500 (i.e. the bottom platen) and the platen 1800 (i.e. the top platen). In this example, the first hole 1901 can be placed through the first centering pin 1505, and the second hole 1902 can be placed through the second centering pin 1506. When the mold is closed, the first centering pin 1505 can rest in the first pin hole 1805, and the second centering pin 1506 rests in the second pin hole 1806.

Figure 20:
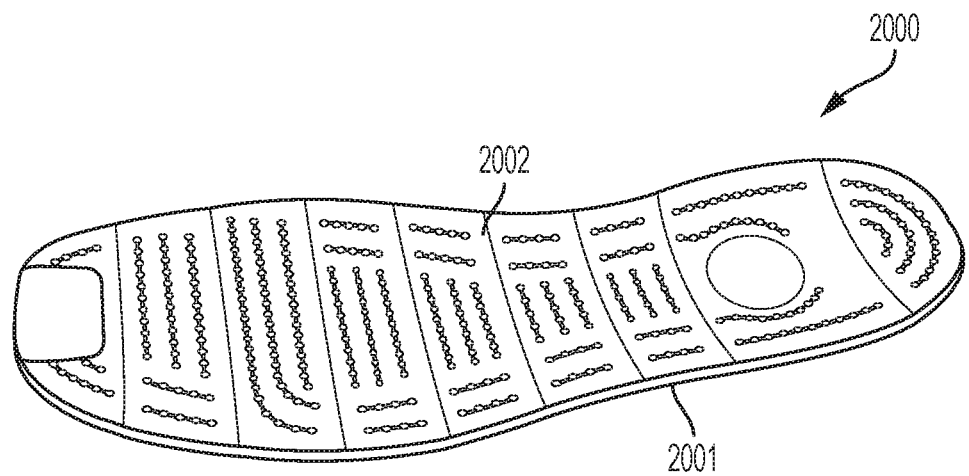
FIG. 20 illustrates an exemplary product of a molding system.

FIG. 20 illustrates an exemplary product, an insole 2000, of a molding system. The insole 2000 comprises a first molding material 2001 and a second molding material 2002. The second molding material 2002 illustrates the molding material 1900 after the insole 2000 has been manufactured according to a disclosed process, such as the process illustrated in FIG. 1. In some embodiments, one or more holes, such as the first hole 1901 and the second hole 1902, are removed from a manufactured product, such as the insole 2000. In some embodiments, a manufacturing process can cause a specific design to be imprinted on a molding material. Such a design can include a drawing, a pattern, a logo, text, and/or any other shapes and forms. For example, after the molding material 1900 has undergone a manufacturing process, the design on the surface of the mold cavity portion 1801 is imprinted in the molding material 1900, as shown in the second molding material 2002, which is a part of the insole 2000.

Various other modifications and additions can be made to the exemplary embodiments discussed without departing from the scope of the present disclosure. For example, while the embodiments described above refer to particular features or particular steps, the scope of this disclosure also includes embodiments having different combinations of features or steps, and embodiments that do not include all of the above described features or steps.

The invention claimed is:

1. A process comprising:
injecting a first molding material into a mold cavity of a mold while the first molding material is liquified, the mold cavity formed by at least a mold cavity portion of a first platen and a second platen when the first platen is in contact with the second platen;
opening the mold after the first molding material has been injected by separating the first and second platens and before placing a second molding material at the first molding material;
placing the second molding material at the first molding material while the first molding material remains with the first platen or the second platen before closing the mold about the first and second molding materials;
sealing a space between the first and second platens wherein the space includes both at least a portion of the first platen and at least a portion of the second platen;
removing a gas from the entirety of the space while the space is sealed; and
closing the mold while the space is sealed.

2. The process of claim 1,
wherein opening the mold after the first molding material has been injected by separating the first and second platens and before placing a second molding material at the first molding material comprises opening the mold by separating the first and second platens by a first distance;
the process further comprising closing the mold until the first and second platens are separated by a second distance that is smaller than the first distance after placing the second molding material at the first molding material.

3. The process of claim 1, wherein closing the mold while the space is sealed comprises joining the first material to the second material.

4. The process of claim 3, wherein sealing the space between the first and second platens comprises placing a sealing device to cover an opening to the space.

5. The process of claim 4, wherein placing a sealing device to cover an opening to the space comprises placing a frame that is coupled to at least two gasket rings to cover the opening to the space, wherein a first gasket ring is in contact with the first platen and a second gasket ring is in contact with the second platen.

6. The process of claim 4, wherein the sealing device is actuated between a first position and a second position, wherein in the first position the sealing device is clear of an injection port, and wherein in the second position, the sealing device seals the space.

7. The process of claim 6, wherein the sealing device is actuated between the first and second positions by a pneumatic control.

8. The process of claim 6, wherein the sealing device is actuated between the first and second positions by a hydraulic control.

9. The process of claim 1, wherein removing a gas from the space while the space is sealed comprises creating a vacuum in the space.

10. The process of claim 1, wherein sealing a space between the first and second platens comprises sealing off an opening to the space.

11. The process of claim 1, further comprising:
closing an injection channel of the mold before placing the second molding material.

12. The process of claim 11, further comprising:
closing the injection channel of the mold by actuating a selective blocking element in the injection channel.

13. The process of claim 1, further comprising:
placing at least one centering pin through at least one hole in the second molding material.

14. The process of claim 1, further comprising:
resting at least one centering pin in at least one pin hole.

15. A process comprising:
injecting a first molding material into a mold cavity of a mold while the first molding material is liquified, the mold cavity formed by at least a mold cavity portion of a first platen and a second platen when the first platen is in contact with the second platen;
opening the mold after the first molding material has been injected by separating the first and second platens and before placing a second molding material between the first and second platens;
placing the second molding material between the first and second platens while the first molding material remains between the first and second platens before sealing a space between the first and second platens with the first and second molding materials within the space, wherein the space includes both at least a portion of the first platen and at least a portion of the second platen;
sealing the space between the first and second platens while the first and second molding materials remain between the first and second platens;
removing a gas from the entirety of the space while the space is sealed; and
closing the mold while the space is sealed.

\* \* \* \* \*